(12) United States Patent
Basile et al.

(10) Patent No.: US 8,887,975 B1
(45) Date of Patent: Nov. 18, 2014

(54) RAIL MOUNTING APPARATUS

(71) Applicants: Vincent M. Basile, Suffield, CT (US); Jennifer A. Basile, Florence, MA (US)

(72) Inventors: Vincent M. Basile, Suffield, CT (US); Jennifer A. Basile, Florence, MA (US)

( * ) Notice: Subject to any disclaimer, the term of this patent is extended or adjusted under 35 U.S.C. 154(b) by 65 days.

(21) Appl. No.: 13/755,067

(22) Filed: Jan. 31, 2013

Related U.S. Application Data

(60) Provisional application No. 61/593,373, filed on Feb. 1, 2012.

(51) Int. Cl.
*B62J 11/00* (2006.01)
*B62J 7/02* (2006.01)

(52) U.S. Cl.
CPC .. *B62J 7/02* (2013.01); *B62J 11/00* (2013.01); *Y10S 224/929* (2013.01)
USPC ............ 224/448; 224/441; 224/452; 224/929

(58) Field of Classification Search
CPC ........................................................ B62J 11/00
USPC ......... 224/412, 419–427, 441–462, 282, 545, 224/548, 553, 558, 567, 929
See application file for complete search history.

(56) References Cited

U.S. PATENT DOCUMENTS

| | | | |
|---|---|---|---|
| 544,216 A | 8/1895 | Droste | |
| 625,746 A | 5/1899 | Colsten | |
| 3,752,375 A | 8/1973 | Weigl | |
| 3,931,919 A | 1/1976 | Gerber et al. | |
| 4,284,100 A | 8/1981 | Scapes et al. | |
| 4,422,615 A | 12/1983 | McManus | |
| 4,725,030 A | 2/1988 | Miller et al. | |
| 4,830,239 A | 5/1989 | Tackles et al. | |
| 4,998,652 A * | 3/1991 | Champagne | 224/414 |
| 5,060,832 A | 10/1991 | Link | |
| 5,170,981 A * | 12/1992 | Lin | 248/311.2 |
| 5,380,061 A | 1/1995 | Pendleton | |
| 5,667,185 A | 9/1997 | Maglica | |
| 5,735,441 A * | 4/1998 | Fujimoto | 224/420 |
| 5,769,556 A | 6/1998 | Colley | |
| 5,913,466 A | 6/1999 | Revels | |
| 6,119,317 A | 9/2000 | Pfister | |
| 6,343,891 B1 | 2/2002 | Combs | |
| 6,669,155 B2 * | 12/2003 | Ron | 248/276.1 |
| 6,708,937 B2 | 3/2004 | Thurman | |
| 6,923,355 B2 * | 8/2005 | Campagnolo | 224/414 |
| 6,986,470 B2 | 1/2006 | Osler | |
| 7,392,967 B2 | 7/2008 | Liaw et al. | |
| 7,712,614 B2 | 5/2010 | Carlson et al. | |
| 7,845,887 B2 | 12/2010 | Smith | |
| 8,132,700 B2 * | 3/2012 | Dacko | 224/431 |

(Continued)

*Primary Examiner* — Justin Larson
(74) *Attorney, Agent, or Firm* — Deborah A. Basile; Karen K. Chadwell

(57) ABSTRACT

A rail mounting apparatus comprising a specially configured rail mount which may be directly mounted to a variety of receivers including a firearm, a recreation vehicle such as, e.g., a bicycle, and the like. The apparatus further comprises a mounting assembly comprising a rail compatible mount and a rail compatible clamp, wherein the mounting assembly is received by the rail mount. The apparatus further comprises an adaptor assembly, wherein the adaptor assembly is received by the mounting assembly to secure the adaptor assembly to the rail mount, and wherein the adaptor assembly is specially configured to hold an accessory, wherein an exemplary accessory includes, for example, a flashlight, a GPS device, a camera, an I-pod, a phone, a water bottle, a water bottle cage, a bag, and the like.

24 Claims, 23 Drawing Sheets

(56) References Cited

U.S. PATENT DOCUMENTS

2005/0045059 A1 3/2005 Osler
2005/0067863 A1 3/2005 Roizen
2009/0012571 A1 1/2009 Perrow et al.

* cited by examiner

RAIL MOUNTING APPARATUS

BACKGROUND OF THE INVENTION

1. Field of the Invention

The present invention relates generally to a mounting apparatus. More particularly, the invention relates to a rail mounting apparatus which is configured to hold a variety of accessories.

2. Background of the Invention.

A prior art bicycle is depicted in FIG. 28. Referring to FIG. 28, a bicycle 1 comprises a handlebar 2, a head tube 3, a seat post 4, a top tube 5, a down tube 6, and a seat tube 7. Bicycles are commonly used as a basic form of transportation, recreation and/or exercise for a rider. The bicycle can also be used to carry items for the convenience of the rider. For this reason, numerous devices exist for the purpose of enhancing the load-carrying capacities of bicycles. For example, luggage racks and cargo baskets allow the rider to keep the rider's hands available for maneuvering the bicycle. However, while these devices allow a bicyclist to carry cargo, they often require a myriad number of cables and tie-downs for securement, especially if cargo includes loose items. Thus, what is needed is a universal mount that allows a bicyclist the ability to mount a wide variety of accessories in a variety of locations on the bicycle

BRIEF SUMMARY OF THE INVENTION

The above referenced problems and deficiencies encountered in the prior art are remedied by a rail mounting apparatus comprising a specially configured rail mount which may be directly mounted to a variety of receivers, wherein exemplary receivers comprises a recreational vehicle, such as, a bicycle, a firearm, and the like. In an exemplary embodiment, the rail mount is directly mounted to a frame of the bicycle, wherein the frame includes a top tube, a down tube, a seat tube, and a seat post, all as known in the prior art. The apparatus further comprises a mounting assembly comprising a mount and a clamp, wherein the mounting assembly is received by the rail mount. The apparatus further comprises an adaptor, wherein the adaptor is received by the mounting assembly, and wherein the adaptor is specially configured to hold an accessory, wherein an exemplary accessory includes, for example, a flashlight, a video camera, an I-pod, a phone, a global positioning system device, a water bottle, a bag, and the like.

DETAILED DESCRIPTION OF THE INVENTION

Figure 1:
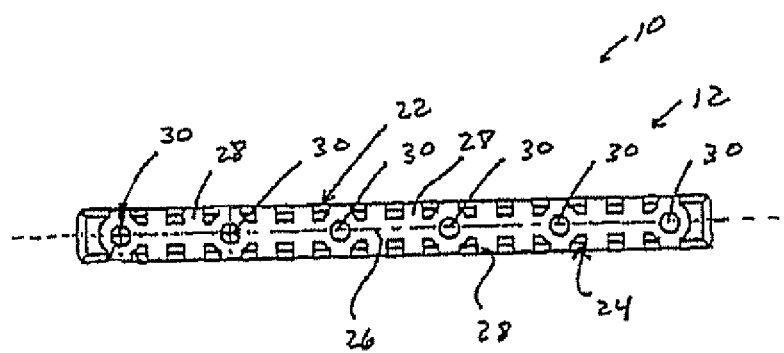
FIGS. 1-3 are schematics depicting an exemplary linear rail mount.

The rail mounting apparatus of the present invention is to incorporate the use of rails as mounts on a variety of receivers including, e.g., recreational vehicles, firearms, etc. to improve the overall strength of the mount and the securement of an accessory to the mount. Exemplary recreational vehicles include, e.g., bicycles, stationary bicycles, motorcycles, all terrain vehicles, boats, jet skis, and the like. In addition to one or more rails, the invention further includes specially configured adaptor assemblies and mounting assemblies, wherein, when used in combination with the rails of the present invention, the adaptor assemblies and/or mounting assemblies increase both the number of accessories which can be secured to the receiver, and the number of locations upon the receiver at which an accessory may be secured. Exemplary accessories include, e.g., a water bottle, a flashlight, a camera, a cell phone, a global positioning system ("GPS") device, a bag, and the like.

In describing exemplary embodiments of the present invention specific terminology is employed for the sake of clarity. The claimed invention, however, is not intended to be limited to the specific terminology so selected, and it is to be understood that each specific element includes all technical equivalents that operate in a similar manner to accomplish a similar purpose.

Turning now to the figures where like labels represent like elements throughout the drawings, various aspects, features and embodiments of the inventive device will be presented in more detail. The examples as set forth in the drawings and detailed description are provided by way of explanation and are not meant as limitations on the scope of the device. The device thus includes any modifications and variations of the following examples as come within the scope of the appended claims and their equivalents. Additionally, although the receiver discussed below primarily refers specifically to a bicycle, it is understood that the rail mounts, the mounting assemblies, and the adaptor assemblies disclosed herein may be adapted in substantially like manner to a wide variety of receivers including for example, a variety of recreational vehicles, firearms, and the like.

Figure 2:
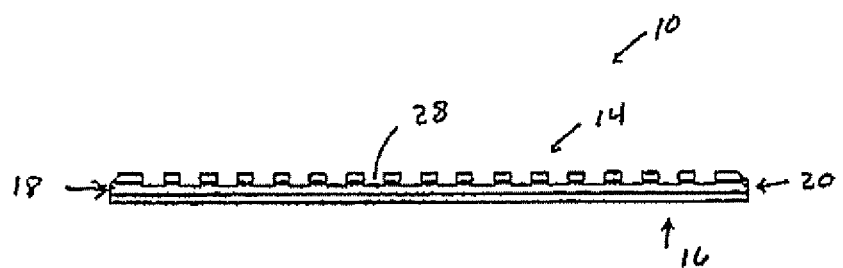
Figure 3:
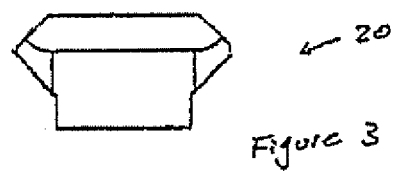

FIGS. 1-3 depict an exemplary linear rail mount 10 which may be attached to a variety of receivers, wherein an exemplary receiver comprises a firearm and a bicycle frame, wherein such frame includes a top tube, a down tube, a seat tube, and a seat post, wherein such frame is known in the prior art. Linear rail mount 10 comprises a body 12 having a top side 14 opposite to a bottom side 16, and a proximal lateral end 18 opposite to a distal lateral end 20. Extending from and rising above top side 14 is a series of protrusions 22 and a series of protrusions 24, wherein series 22 is oppositely situated to series 24 to form a channel 26 which extends from proximal and distal lateral ends 18 and 20. A space 28 separates each adjacently situated protrusion from another protrusion in each of respective series 22 and 24. In the embodiment depicted in FIGS. 1-3, each of proximal and distal lateral ends 18 and 20 comprises a dovetail configuration. Furthermore, a plurality of through holes 30 is formed through top side 14 and bottom side 16 along channel 26 such that rail 10 may be mounted to a receiver, such as, e.g., a firearm, the frame of a bicycle, etc., by aligning one or more of the through holes of plurality 30 with a corresponding hole formed through and/or on the firearm or the frame, and by then inserting one or more of a fastening member, e.g., a screw, bolt, and the like, through a through hole of plurality 30 and the corresponding hole.

Figure 4:
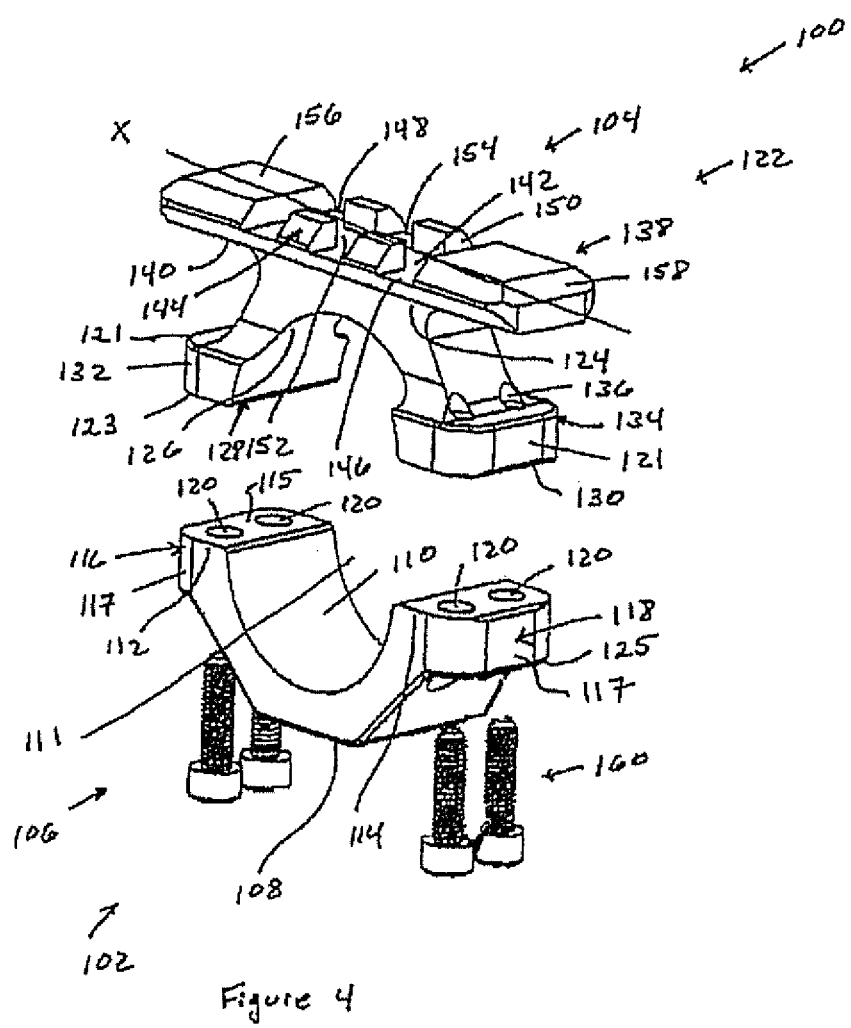
FIG. 4 is a schematic depicting an exemplary annular rail mount.

An exemplary annular rail mount 100 is depicted in FIG. 4. Here, annular rail mount 100 comprises a bottom member 102 and an upper member 104. Bottom member 102 comprises a substantially arcuate-shaped body 106 having a convex-shaped exterior side 108 oppositely situated to a concave-shaped interior side 110, and which terminates at a first terminal end 112 and at a second terminal end 114. A flange 116 extends from terminal end 112, and a flange 118 extends from terminal end 114. Each of flanges 116 and 118 comprises an upper wall 115 disposed on each of terminal ends 112 and 114, and a lower wall 125 oppositely situated to upper wall 115. Holes 120 are formed on upper wall 115 and extend through lower wall 125. Each of flanges 116 and 118 further comprises a wall 117 which is disposed on exterior side 108, and which extends approximately perpendicularly from respective walls 115 and 117.

Upper member 104 comprises a body 122. Body 122 comprises a substantially planar top wall 124 and a concave-shaped interior wall 126. Interior wall 126 terminates at a first terminal end 128 and at a second terminal end 130, wherein each of terminal ends 128 and 130 is oppositely situated to top wall 124. Upper member 104 further comprises flanges 132 and 134. Each of flanges 132 and 134 comprises a wall 121 which extends from respective terminal ends 128 and 130 in a direction opposite to interior wall 126. Each of walls 121 of flanges 132 and 134 has holes 136 formed on a bottom side 123 thereof.

Upper member 104 further comprises a substantially linear shaped rail 138 comprising a bottom side 140 which is disposed on top wall 124 of body 122. A top side 142 of rail 138 comprises a longitudinal axis X running down a center of top side 142. Extending from a lateral edge 146 of rail 138 and towards longitudinal axis X is a plurality of protrusions 144, and extending from a lateral edge 148 of rail 138 and towards longitudinal axis X is a plurality of protrusions 150, wherein a channel 152 is formed between pluralities 144 and 150, and spaces 154 are formed between the protrusions of each adjacently situated protrusion in each of pluralities 144 and 150. Flanking plurality of protrusions 144 and 150 and disposed on top side 142 of rail 138 are blocks 156 and 158.

Upper member 104 may be connected to bottom member 102 by aligning holes 120 with holes 136 and securing members 104 and 102 via screws 160 thereby forming an annular shaped opening 111. In this position, annular rail mount 100 is particularly well suited to attachment to, e.g., the handlebars of a bicycle, though it may be attached to other portions of the frame of the bicycle, such as, for example, the seat tube, the down tube, the top tube, the seat post, and the like.

Figure 29:
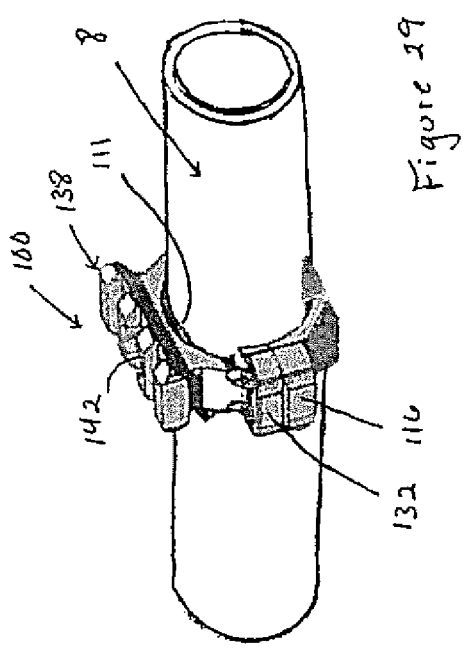
FIG. 29 is a schematic depicting an exemplary application of the annular rail mount depicted in FIG. 4 to a bicycle frame.

An exemplary application of annular rail mount to a frame of a bicycle, wherein the frame may include, e.g., a top tube, a down tube, a seat tube, a seat post, and the like, is depicted in FIG. 29. Here, annular rail mount 100 is disposed around frame 8 of a bicycle such that frame 8 is contained within opening 111 and such that top side 142 of rail 138 is directed away from frame 8.

Figure 5:
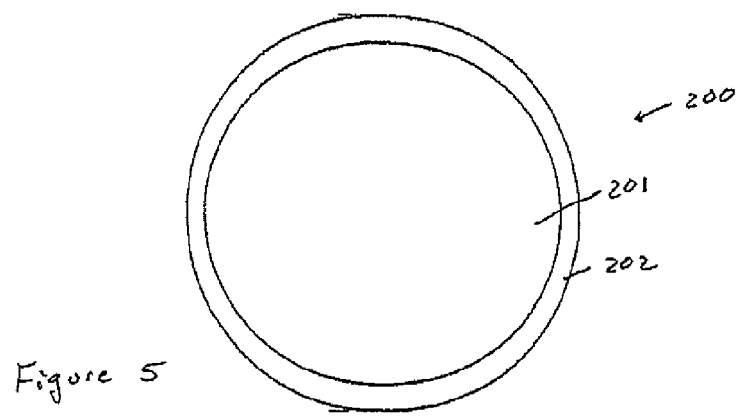
FIGS. 5 and 6 are schematics depicting an exemplary bumper.
Figure 6:
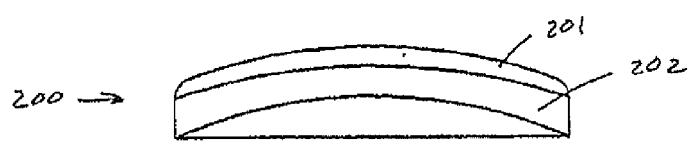

As the receiver to which annular rail mount 100 is to be attached may vary widely in diameter, it may be desirable to fit annular rail mount 100 with a bumper 200 such as is shown in FIGS. 5 and 6. Referring to FIGS. 5 and 6, bumper 200 comprises a substantially spherical-shaped body 201 having a rib member 202 which extends along an outer perimeter of body 201. In an exemplary application, one or more of bumpers 200 may be positioned within the annular shaped opening formed through upper member 104 and bottom member 102 such that, when annular rail mount 100 is properly applied around a receiver, rib member 202 abuts the receiver and secures mount 100 thereto via a frictional fit.

Once linear rail mount 10 and/or annular rail mount 100 are properly attached to a receiver, it may then be desirable to attach an accessory to respective mounts 10 and 100. Where the receiver is a recreational and/or stationary bicycle, exemplary accessories include, for example, a flashlight, a video camera, an I-pod, a GPS device, a phone, a water bottle, a water bottle cage, a bag, and the like. To assist in the securement of an accessory to mounts 10 and 100, the invention further comprises a mounting assembly which may be engaged with linear rail mounts 10 and 100. The invention further comprises a plurality of adaptor assemblies, wherein each adaptor assembly is configured to attach one or more accessories to linear rail mount 10 and/or to annular rail mount 100.

Figure 7:
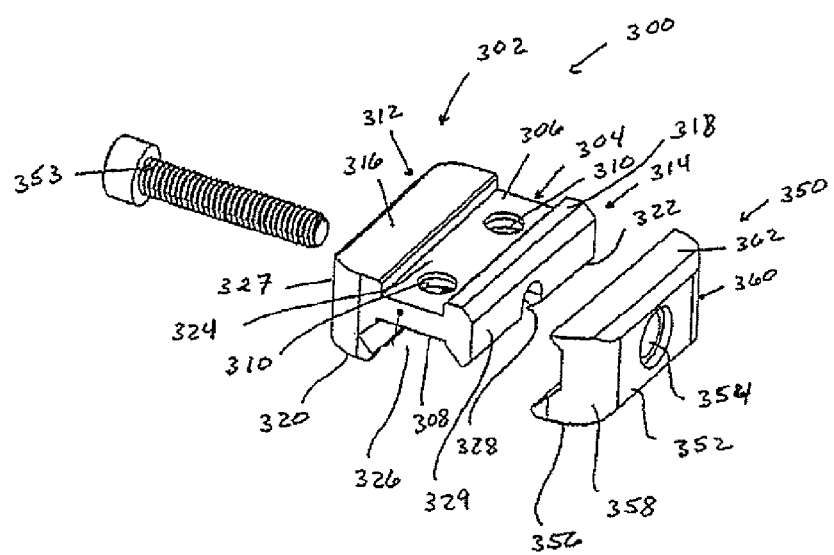
FIG. 7 is a schematic depicting an exemplary mounting assembly.

An exemplary mounting assembly 300, useful for attaching an accessory to linear rail mount 10 and to annular rail mount 100, is depicted in FIG. 7. Here, mounting assembly 300 comprises a rail compatible mount 302 and a rail compatible clamp 350. Mount 302 comprises a plate 304 having a top side 306 opposite to a bottom side 308, wherein a plurality of holes 310 is formed through top side 306 and bottom side 308. Oppositely disposed to one another on respective lateral sides of plate 304 is a proximal side wall 312 and a distal side wall 314, wherein each of side walls 312 and 314 extend above top side 306 to form a respective top wall 316 and 318 and extend below bottom side 308 to form a respective bottom wall 320 and 322, thereby effectively creating a channel 324 between top walls 316 and 318 and a channel 326 between bottom walls 320 and 322. Each of proximal side wall 312 and distal side wall 314 respectively comprises a lateral wall 327 and 329 which joins respective top walls 316 and 362 to respective bottom walls 320 and 356, and further wherein each of lateral walls 327 and 329 comprises an opening 328 formed therethrough wherein each of openings 328 is aligned with channel 326.

Rail compatible clamp 350 comprises a main side wall 352 having an opening 354 formed therethrough. Extending substantially perpendicularly from main side wall 352 is a bottom wall 356. A side wall 358 and its oppositely situated side wall 360 extend substantially perpendicularly from bottom wall 356 and join bottom wall 356 to a top wall 362.

Rail compatible clamp 350 is joined to rail compatible mount 302 by aligning opening 328 formed through lateral wall 329 with opening 354 such that top wall 362 extends over channel 324 and is coplanar with top wall 316, such that bottom wall 356 extends over channel 326 and is coplanar with bottom wall 320, and such that channel 326 assumes a substantially dove-tail configuration. A fastening member 353, such as, e.g., a bolt, screw, nut, bushing, and the like, may be inserted through openings 328 and opening 354 and tightened thereby securing clamp 350 to mount 302. Bottom wall 320 of mount 302 and bottom wall 356 of clamp 304 in combination with bottom wall 322 of mount 302, are configured to receive body 12 of linear rail mount 10 and body 122 of linear shaped rail 138 of annular rail mount 100.

As previously written, mounting assembly 300 may be used in combination with linear rail mount 10 and with annular rail mount 100 to attach a wide variety of accessories to a receiver. To further assist in accomplishing the attachment of an accessory to mounts 10 and 100, an adaptor assembly may be used.

Figure 8:
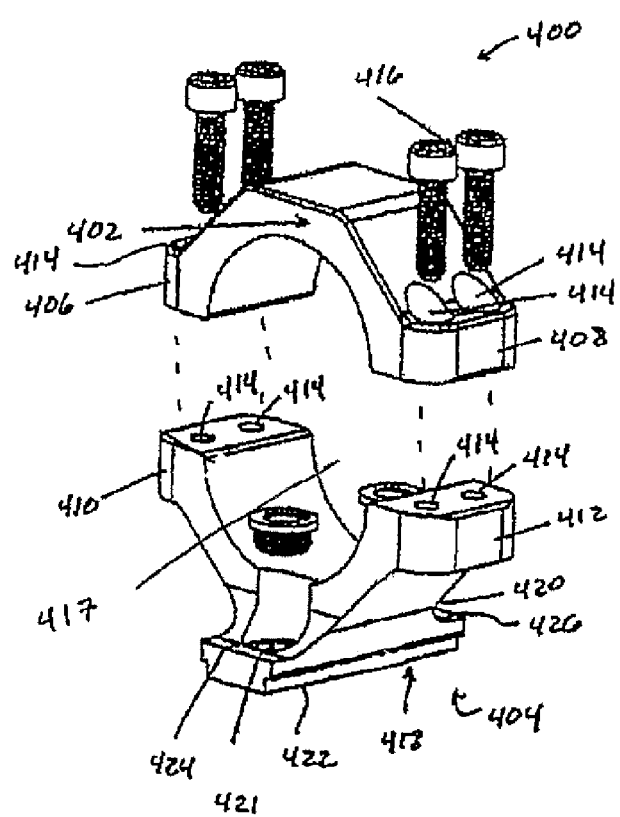
FIG. 8 is a schematic depicting an exemplary adaptor assembly.

Exemplary adaptor assemblies for attaching accessories having a substantially cylindrical configuration are depicted in FIGS. 8-12. Referring to FIG. 8, an exemplary adaptor assembly 400 comprises a generally arcuate-shaped upper member 402 oppositely situated to a generally arcuate-shaped lower member 404. Each of upper member 402 and lower member 404 comprises oppositely situated lateral flanges, respectively labeled as flanges 406 and 408, and flanges 410 and 412. All of flanges 406, 408, 410, and 412 comprise holes 414 formed therethrough. Hole 414 of flange 406 may be aligned with hole 414 of flange 410, and hole 414 of flange 408 may be aligned with hole 414 of flange 412, and fastening members 416 may be disposed within all of holes 414 to secure upper member 402 to lower member 404 thereby forming an annular shaped opening 417.

Adaptor assembly 400 further comprises a plate 418 disposed centrally on a bottom side 420 of lower member 404, wherein bottom side 420 is oppositely situated from flanges 410 and 412. Plate 418 extends rearward and forward from bottom side 420. Plate 418 comprises a configuration geometrically compatible with channel 324 of mounting assembly 300. Plate 418 further comprises a hole 421 formed through a top side 422 and a bottom side 424 of plate 418 rearward of lower member 404. Plate 418 further comprises a hole 426 formed through top side 422 and bottom side 424 forward of lower member 404.

Adaptor assembly 400 may be fastened to mounting assembly 300 by aligning holes 421 and 426 with holes 310, and by inserting a fastening member within respective holes 421 and 310 and holes 426 and 310, and tightening the fastening member.

Figure 9:
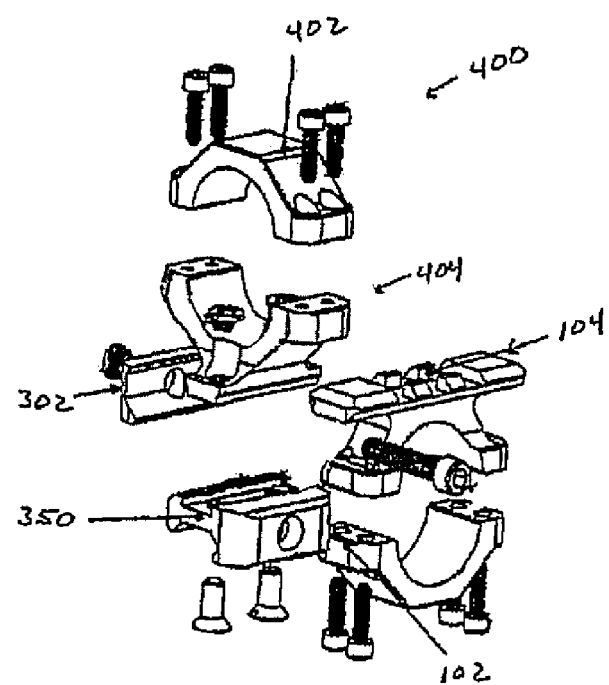
FIG. 9 is a schematic depicting an exemplary rail mounting apparatus comprising the annular rail mount depicted in FIG. 4, the mounting assembly depicted in FIG. 7, and the adaptor assembly depicted in FIG. 8.

FIG. 9 depicts the attachment and interconnectivity of adaptor assembly 400, mounting assembly 300, and annular rail mount 100. As shown, top side 422 of plate 418 of lower member 404 of adaptor assembly 400 abuts top side 306 of plate 304 of mount 302 while fastening member 353 secures lower member 404 of adaptor assembly 400 between mount 302 and clamp 350. Additionally, linear shaped rail 138 of annular rail mount 100 is fitted within channel 326 of mounting assembly 300.

Figure 11:
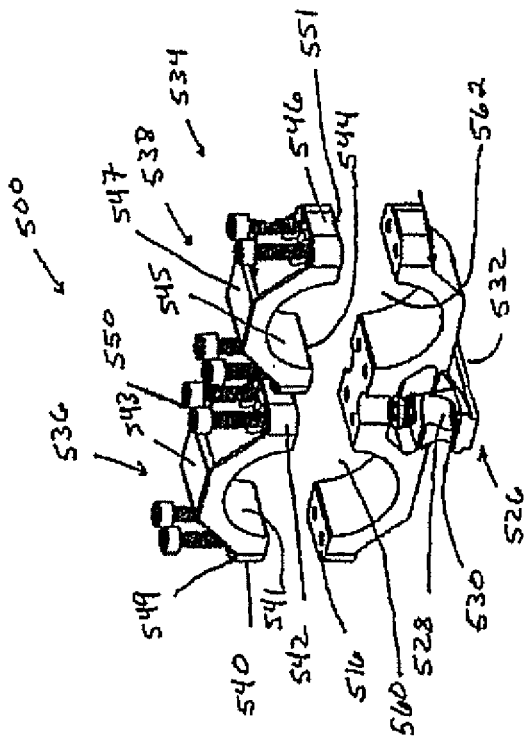
FIGS. 10 and 11 are schematics depicting another exemplary adaptor assembly.
Figure 10:
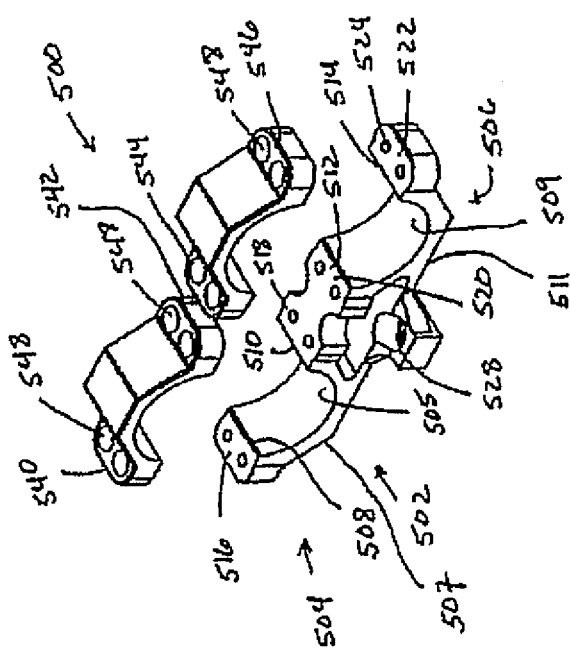

FIGS. 10 and 11 depict another exemplary adaptor assembly 500, wherein adaptor assembly 500 is ideally suited for holding a plurality of generally cylindrical-shaped accessories, such as, e.g., flashlights, water bottles, water bottle cages, and the like. Adaptor assembly 500 comprises a bottom part 502 having two adjacently positioned arcuate-shaped halves, respectively numbered 504 and 506. Half 504 comprises a substantially concave-shaped interior wall 505 oppositely situated to an exterior wall 507; and half 506 comprises a substantially concave-shaped interior wall 509 oppositely situated to an exterior wall 511. Exterior wall 507 is coterminous with exterior wall 511.

Each of halves 504 and 506 has two terminal ends, respectively numbered 508 and 510 and 512 and 514, from which respective flanges 516 and 518 and 520 and 522 extend. Flanges 516 and 518 are directed opposite from interior wall 505, and flanges 520 and 522 are directed opposite from interior wall 509. Flange 518 of half 504 is coterminous with flange 520 of half 506. All of flanges 512, 514, 516, and 518 comprise holes 524 formed on a top side 527 of each of flanges 512, 514, 516, and 518.

Adaptor assembly 500 further comprises a plate 526 which is disposed on exterior walls 509 and 511, and which is centrally disposed below flanges 518 and 520. Plate 526 extends both forward and rearward of bottom part 502. Plate 526 comprises a hole 528 formed through a top side 530 and a bottom side 532 rearward of bottom part 502. Plate 518 further comprises a hole (not shown) formed through top side 530 and bottom side 532 forward of bottom part 502.

Adaptor assembly 500 further comprises a top part 534 having a first arcuate-shaped member 536 and a second arcuate-shaped member 538. Member 536 comprises a substantially concave-shaped interior wall 541 oppositely situated to an exterior wall 543, and member 538 comprises a substantially concave-shaped interior wall 545 oppositely situated to an exterior wall 547.

Respective flanges 540, 542, 544, and 546 extend from terminal ends of each of members 536 and 538. Furthermore, all of flanges 540, 542, 544, and 546 comprise a plurality of holes 548 formed through a top side 549 and a bottom side 551 of each of flanges 540, 542, 544, and 546. Top part 534 is secured to bottom part 502 by aligning hole 548 of flange 540 with hole 524 of flange 516, aligning hole 548 of flange 542 with hole 524 of flange 518, aligning hole 548 of flange 544 with hole 524 of flange 520, and aligning hole 548 of flange 546 with hole 524 of flange 522, and by inserting a fastening member 550 within all of holes 524 and 548 and tightening fastening members 550. In this manner, two generally circular-shaped openings 560 and 562 are formed each of which may receive a generally cylindrical-shaped accessory.

Figure 12:
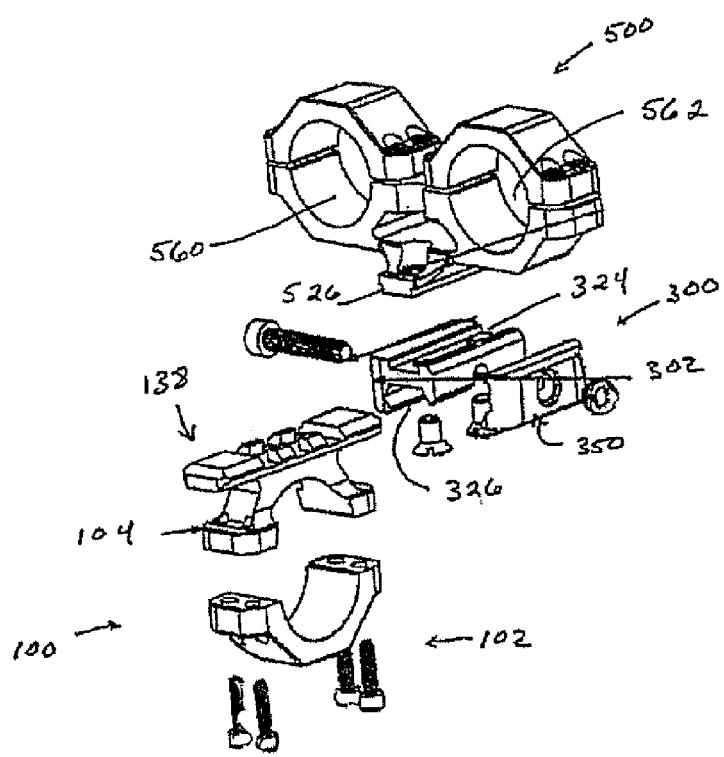
FIG. 12 is a schematic depicting an exemplary rail mounting apparatus comprising the annular rail mount depicted in FIG. 8, the mounting assembly depicted in FIG. 7, and the adaptor assembly depicted in FIGS. 10 and 11.

FIG. 12 depicts the attachment and interconnectivity of adaptor assembly 500, mounting assembly 300, and annular rail mount 100. As shown in these figures, plate 526 of bottom part 502 fits within channel 324 of mounting assembly 300 while linear shaped rail 138 of annular rail mount 100 is fitted within channel 326 of mounting assembly 300.

Figure 30:
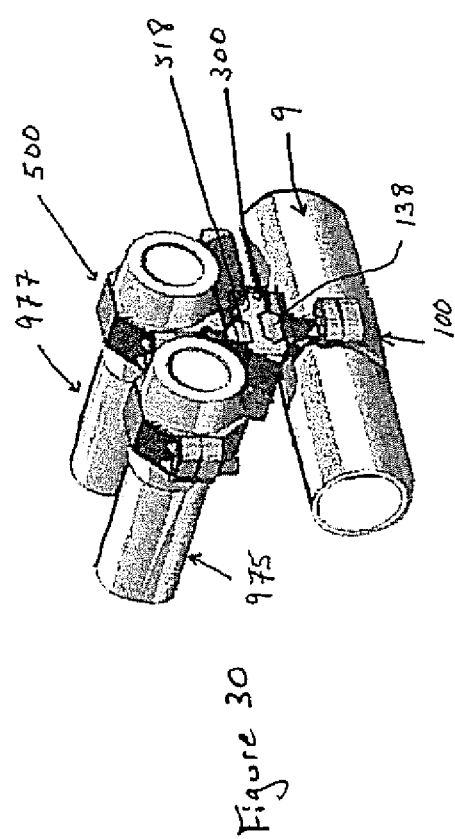
FIG. 30 is a schematic depicting an exemplary application of the rail mounting apparatus depicted in FIG. 12 to a bicycle frame.

An exemplary application of the rail mounting assembly depicted in FIG. 12 to a frame of a bicycle, wherein the frame may include, e.g., a top tube, a down tube, a seat tube, a seat post, and the like, is depicted in FIG. 30. Here, annular rail mount 100 is disposed around a frame 9 of a bicycle such that frame 9 is contained within opening 111 and such that top side 142 of rail 138 is directed away from frame 9. Channel 326 of mounting assembly 300 receives rail 138, while channel 324 of mounting assembly 300 receives bottom side 532 of plate 518. A flashlight 975 is disposed within opening 560 and a flashlight 977 is disposed within opening 562.

Figure 13:
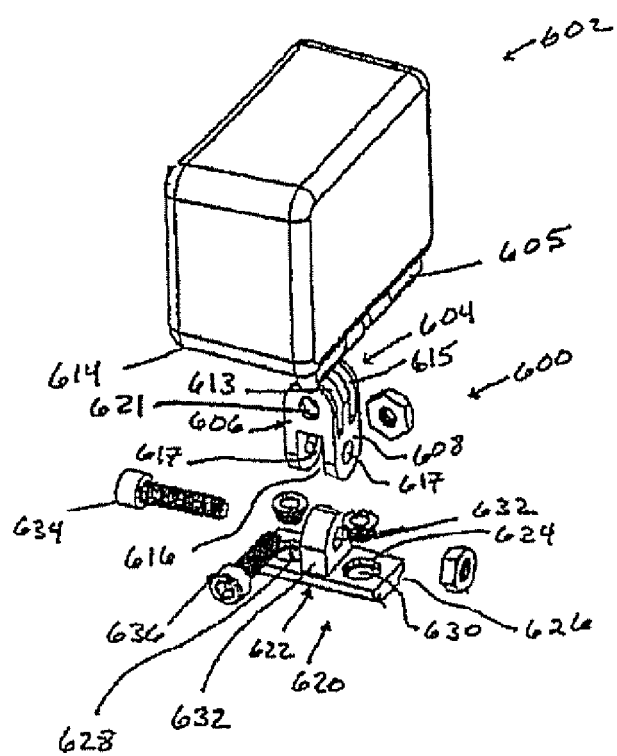
FIG. 13 is a schematic depicting an exemplary adaptor assembly.
Figure 14:
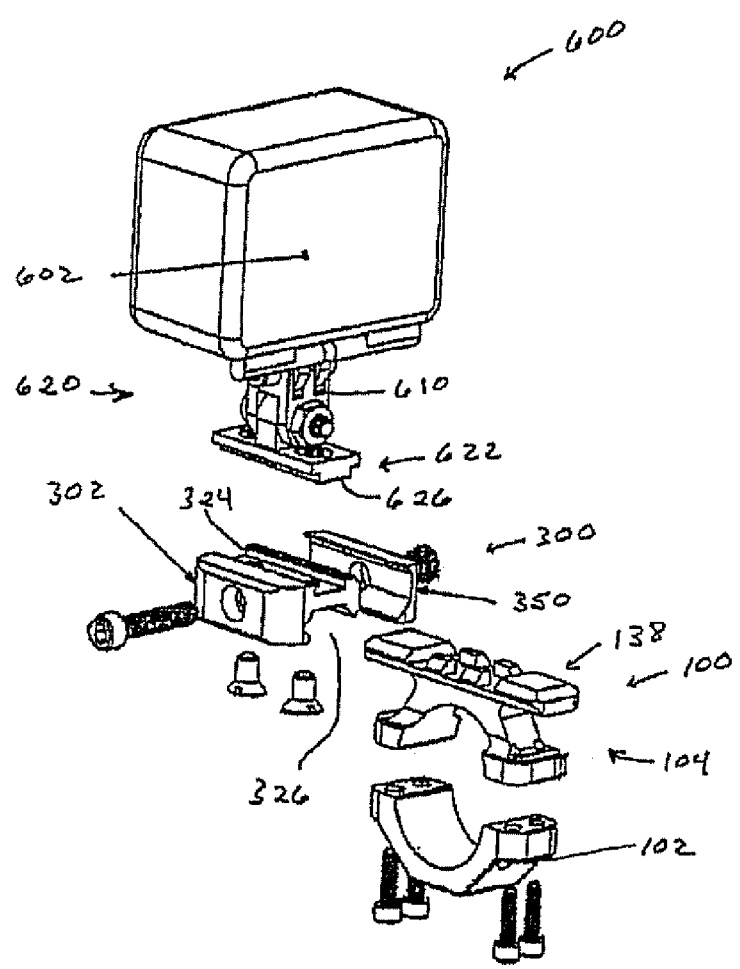
FIG. 14 is a schematic depicting an exemplary rail mounting apparatus comprising the adaptor assembly depicted in FIG. 13, the annular rail mount depicted in FIG. 4, and the mounting assembly depicted in FIG. 7.

FIGS. 13 and 14 depict an exemplary adaptor assembly 600 which is especially configured for attachment of, e.g., a camera 602 to a linear rail mount 10 and/or to annular rail mount 100. As depicted in FIGS. 13 and 14, adaptor assembly 600 comprises a swivel member 604 and a interface mount 620. Interface mount 620 comprises a plate 622 having a top side 624 opposite to a bottom side 626. Plate 622 further comprises a hole 628 and a hole 630. Extending from top side 624 and positioned between holes 628 and 630 is a tab 632 which has a hole 634 formed crosswise therethrough. Bottom side 626 of plate 622 comprises a substantially T-shaped cross-section, which is configured for engagement with channel 324 of mounting assembly 300 (see, e.g., FIG. 14).

Swivel member 604 comprises an accessory receiving member on a first end thereof and a mount receiving member on a second end thereof, wherein the first end is oppositely situated to the second end. In an exemplary embodiment, accessory receiving member comprises three parallel fins 606, and mount receiving member comprises two parallel fins 608, wherein fins 606 are transversely positioned relative to fins 608. Each of fins 608 comprises a hole 617 formed crosswise therethrough. Between adjacent fins 606 is a space 610 which receives a first fin 613 and a second fin 615 which extend from a base 614 of camera 602 and which are secured thereto by a longitudinally extending rod 605. Between fins 608 is a space 616 which receives tab 632. A fastening member 634 may be inserted within holes 617 and hole 632 to secure swivel member 604 to interface mount 620, while a fastening member 636 may be inserted through holes 621 formed through fins 606 and through fins 613 and 615 and tightened thereto to secure camera 602 to swivel member 604. Holes 621 are transversely situated relative to holes 617.

FIG. 14 depicts the attachment and interconnectivity of adaptor assembly 600, mounting assembly 300, and annular rail mount 100. As shown in these figures, bottom side 626 of plate 622 fits within channel 324 of mounting assembly 300, while linear shaped rail 138 fits within channel 326 of mounting assembly 300.

Figure 15:
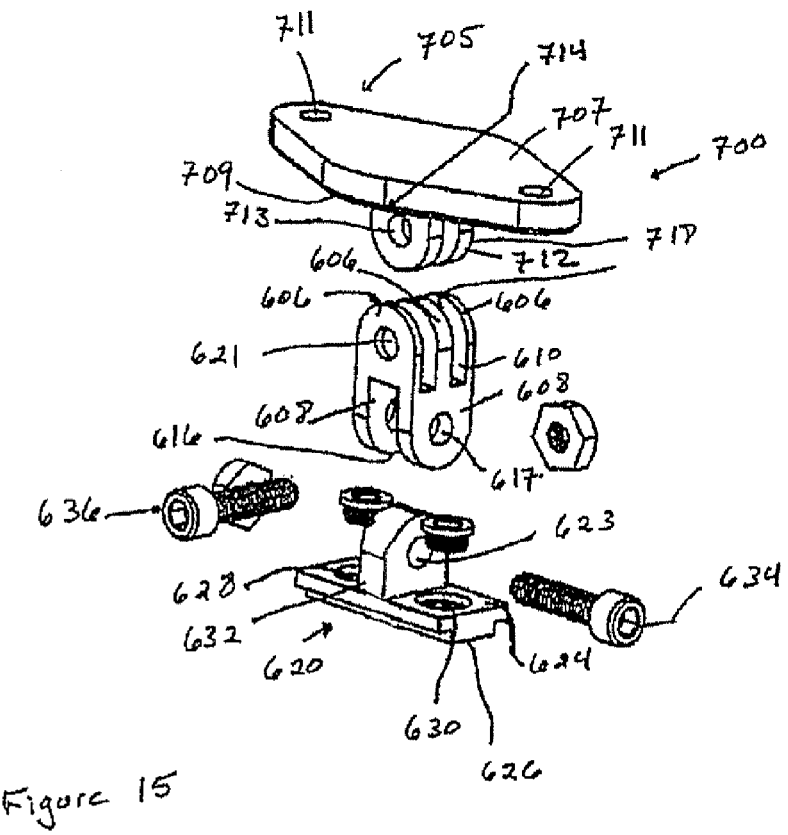
FIG. 15 is a schematic depicting an exemplary adaptor assembly.
Figure 16:
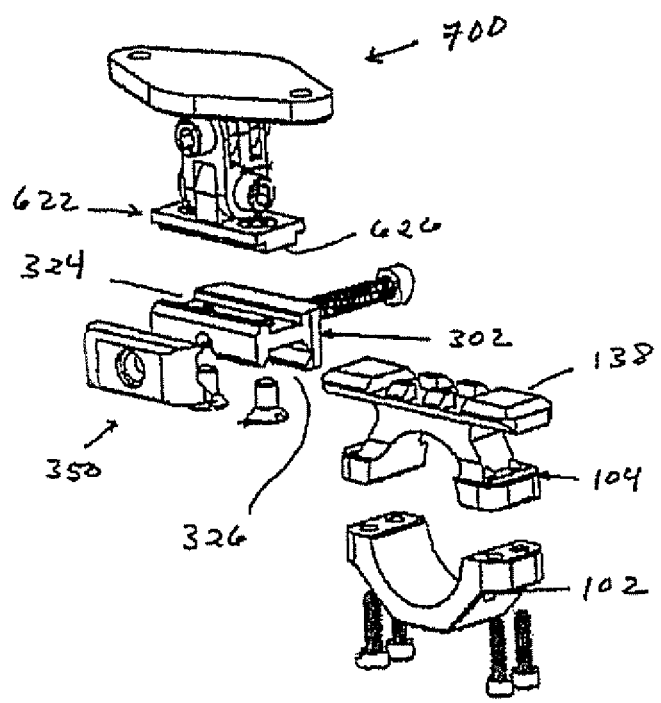
FIG. 16 is a schematic depicting an exemplary rail mounting apparatus comprising the adaptor assembly depicted in FIG. 15, the annular rail mount depicted in FIG. 4, and the mounting assembly depicted in FIG. 7.

FIG. 15 depicts an exemplary adaptor assembly 700 which is especially configured for attachment of, e.g., a cell phone, a GPS device, and the like to linear rail mount 10 and/or to annular rail mount 100. As depicted in FIGS. 15 and 16, adaptor assembly 700 comprises swivel member 604 and interface mount 620 as described above with reference to FIGS. 13 and 14.

Adaptor assembly 700 further comprises an accessory mount 705. Accessory mount 705 comprises a base 714 having a substantially planar top side 707 opposite to a bottom side 709. A pair of holes 711 are formed through top and bottom sides 707 and 709. An accessory, such as, e.g., a cell phone, a GPS device, and the like may be disposed on top side 707 and secured thereto via fastening screws disposed through pair of holes 711.

Extending from bottom side 709 of base 705 and disposed thereon is a pair of engaging members 712. Each of engaging members from pair 712 comprises a front side 717 opposite to a back side 719, wherein a hole 713 is formed through front and back sides 717 and 719, wherein holes 713 are aligned with one another. Spaces 610 of swivel member 604 receive pair of engaging members 712 such that holes 713 are aligned with holes 621 of swivel member 704.

FIG. 16 depicts the attachment and interconnectivity of adaptor assembly 700, mounting assembly 300, and annular rail mount 100. As shown in FIG. 16, bottom side 626 of plate 622 fits within channel 324 of mounting assembly 300, while linear shaped rail 138 fits within channel 326 of mounting assembly 300.

Figure 17:
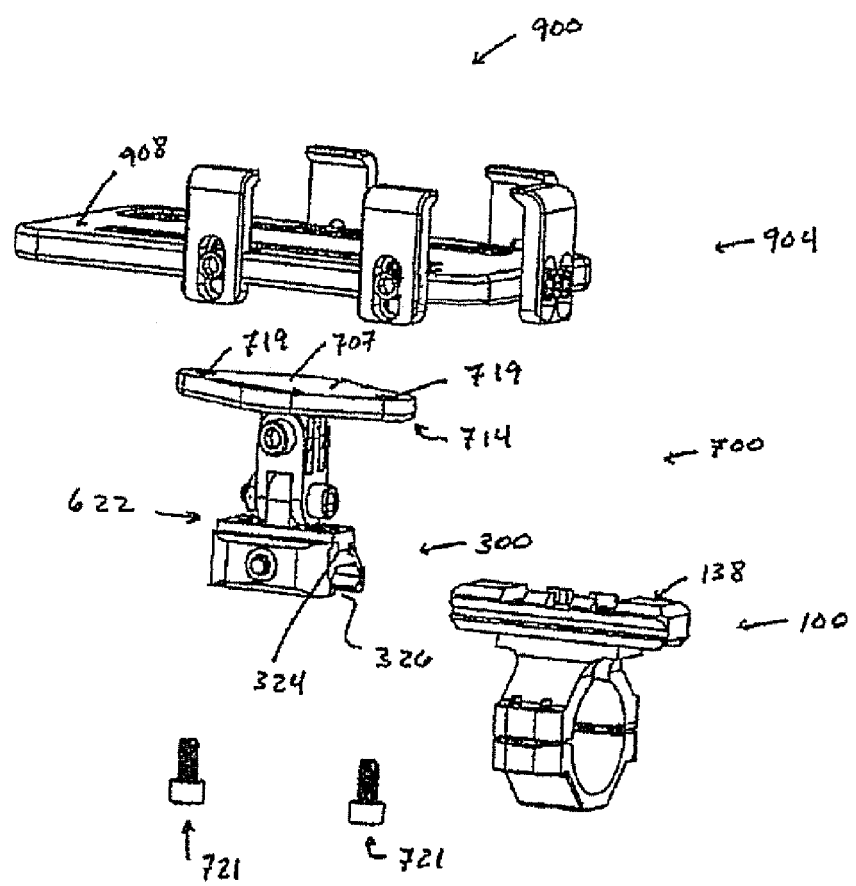
FIG. 17 is a schematic depicting an exploded view of the rail mounting apparatus depicted in FIG. 16, and further comprising an exemplary accessory receiving assembly.
Figure 18:
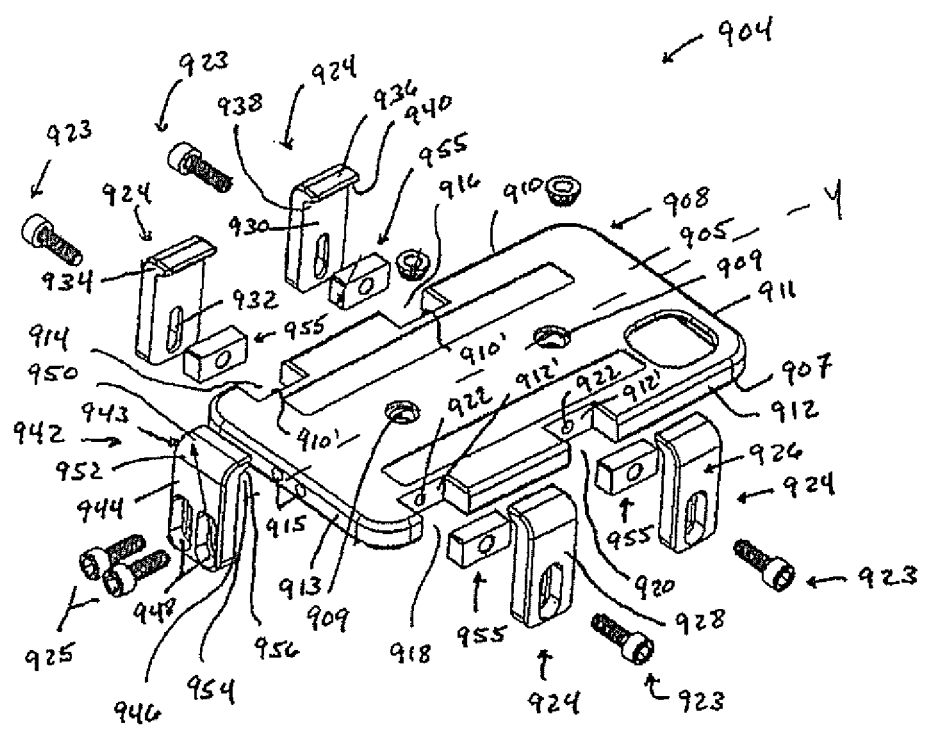
FIG. 18 is a schematic depicting the accessory receiving assembly of the rail mounting apparatus depicted in FIG. 17.

Referring to FIG. 17, an exemplary rail mounting apparatus 900 comprises adaptor assembly 700 as described with reference to FIGS. 15 and 16 in combination with a receiving assembly 904. Referring to FIG. 18, receiving assembly 904 comprises a plate 908 having a top face 905 opposite to a bottom face 907, wherein a pair of throughholes 909 are centrally formed along a longitudinally axis Y thereof through top face 905 and bottom face 907. Plate 908 further comprises side walls comprising a first lateral side wall 910 opposite to a second lateral side wall 912, and an upper side wall 911 opposite to a lower side wall 913, wherein lower side wall 913 comprises a pair of holes 915 formed centrally therein.

First lateral side wall 910 has indents 914 and 916 formed therein, while second lateral side wall 912 has indents 918 and 920 formed therein, such that indent 914 is aligned with indent 918 and indent 916 is aligned with indent 920. Each of indents 914 and 916 terminate at a first lateral side wall 910', while each of indents 918 and 920 terminate at a second lateral side wall 912', and further wherein indents 914, 916, 918, and 920 have holes 922 formed through respective first side walls 910' and 912'.

Receiving assembly 904 further comprises a plurality of brackets 924. Each bracket from plurality 924 comprises a body 926 having a front side 928 opposite to a back side 930, wherein a throughhole 932 is formed through front and back sides 928 and 930. Each bracket from plurality 924 further comprises a flange 936 which extends rearward from front side 928, towards back side 930, and approximately perpendicularly from a terminal end 934 thereof such that a space 938 is created between an underside 940 of flange 936 and back side 930. Each bracket from plurality 924 is fixed to one of indents 914, 916, 918, and 920 formed on respective first and second lateral sides 910 and 912 via fastening screws 923 which are inserted within the respective throughholes 932 of the brackets of plurality 924 and through hole 922 of respective indents 914, 916, 918, and 920.

Receiving assembly 904 further comprises a plurality of buttressing members 955, wherein a first set of buttressing members from plurality 955 is disposed between first lateral side wall 910' and brackets from plurality 924, and a second set of buttressing members from plurality 955 is disposed between second lateral side wall 912' and brackets from plurality 924, wherein both sets of buttressing members are secured thereto via fastening screws 923.

Receiving assembly 904 further comprises a bracket 942 which comprises a body 943 having a front side 944 opposite to a back side 946, wherein throughholes 948 are formed through front and back sides 944 and 946. Bracket 942 further comprises a tab 950 which extends rearward from front side 944, towards back side 946, and approximately perpendicularly from a terminal end 952 of body 943 such that a space 954 is created between an underside 956 of flange 936 and back side 946. Bracket 942 is fixed to lower side wall 913 of plate 908 via a pair of fastening screws 925 which are inserted through throughholes 948 and holes 915.

FIG. 17 depicts an exemplary attachment and interconnectivity of receiving assembly 904, adaptor assembly 700, mounting assembly 300, and annular rail mount 100. Here, receiving assembly 904 is connected to top side 707 of base 714 by aligning pair of throughholes 909 formed through plate 908 with pair of holes 711, and by securing receiving assembly 904 to base 714 via fastening screws 721 which are positioned within pair of throughholes 909 and pair of holes 711. Bottom side 626 of plate 622 of adaptor assembly 700 fits within channel 324 of mounting assembly 300, while linear shaped rail 138 fits within channel 326 of mounting assembly 300.

Figure 19:
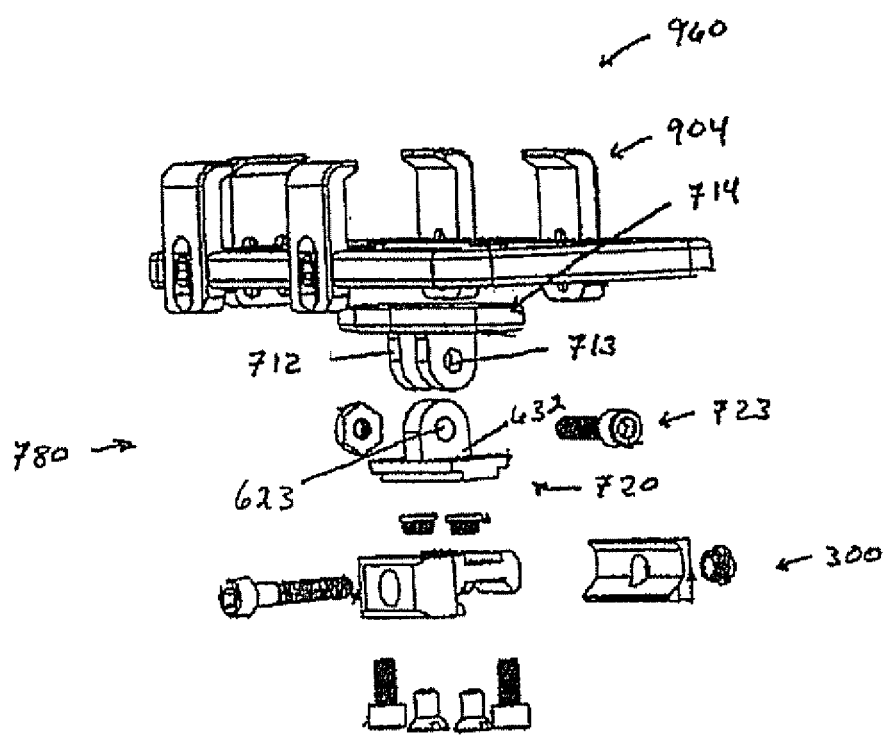
FIG. 19 is a schematic depicting an exploded view of an exemplary rail mounting apparatus comprising an exemplary adaptor assembly, the accessory receiving assembly depicted in FIG. 18, and the mounting assembly depicted in FIG. 7.

FIG. 19 depicts an exemplary rail mounting apparatus 960 comprising receiving assembly 904 in combination with an exemplary adaptor assembly 780 and mounting assembly 300. Adaptor assembly 780 comprises interface mount 620 directly connected to accessory mount 705. More particularly, tab 632 of interface mount 620 is disposed between pair of engaging members 712 of accessory mount 705 such that hole 623 is aligned with holes 713 of pair of engaging members 712 such that a fastening screw 723 may be positioned through hole 623 and holes 713 and secured thereto via a nut 725, thereby securing interface mount 620 to base 714. Although not depicted, receiving assembly 904, accessory mount 705, interface mount 620, and mounting assembly 300 may be attached to an annular rail mount 100 and/or to linear rail mount 10 as described above-herein.

Figure 20:
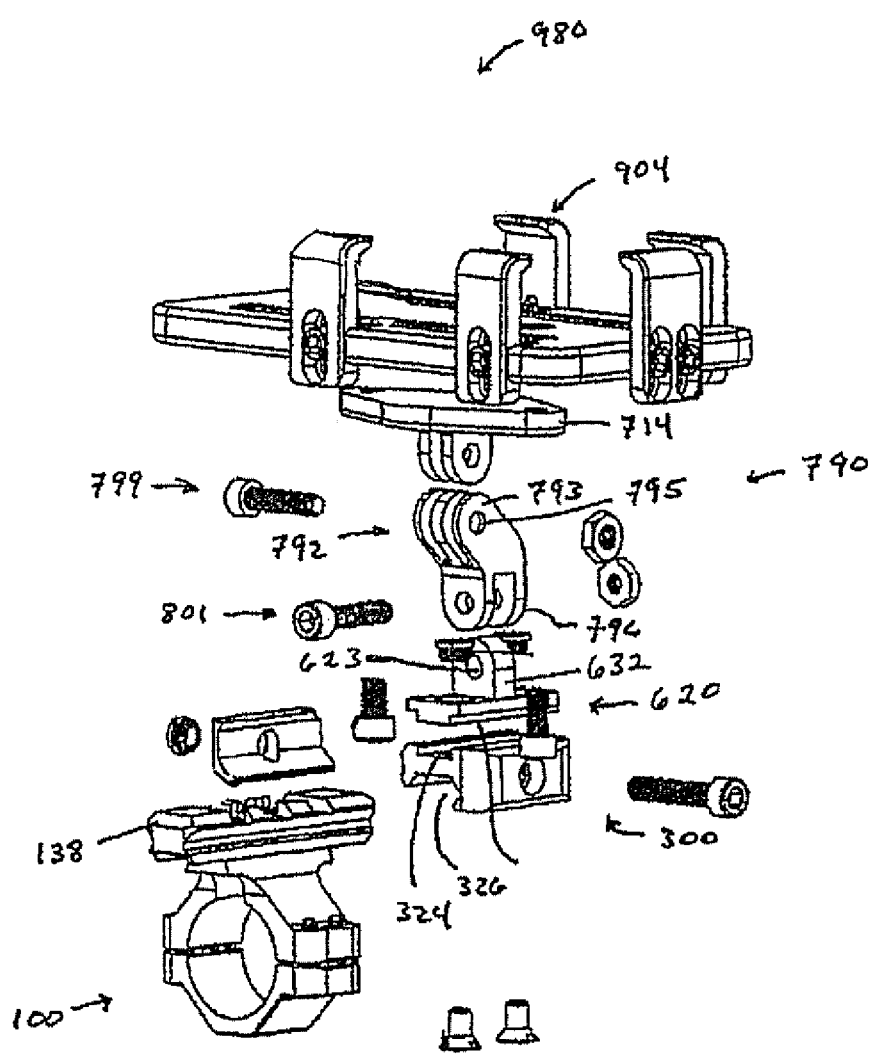
FIG. 20 is a schematic depicting an exploded view of an exemplary rail mounting apparatus comprising an exemplary adaptor assembly, the accessory receiving assembly depicted in FIG. 18, the mounting assembly depicted in FIG. 7, and the annular rail mount depicted in FIG. 4.
Figure 21:
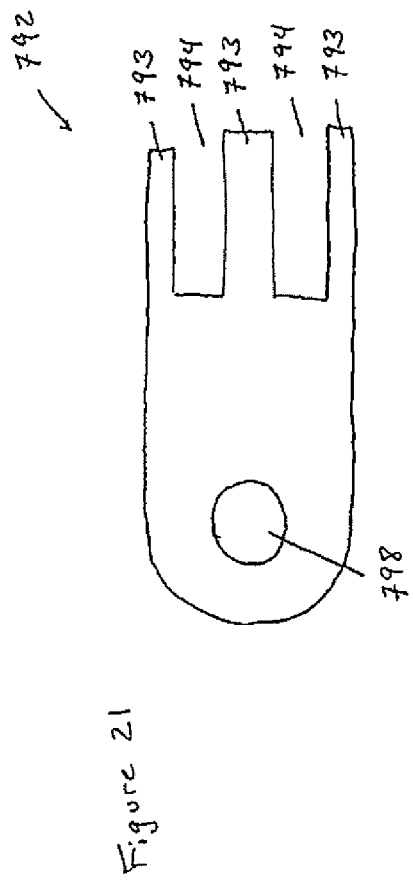
FIGS. 21 and 22 are schematics depicting a swivel member of the adaptor assembly depicted in FIG. 20.
Figure 22:
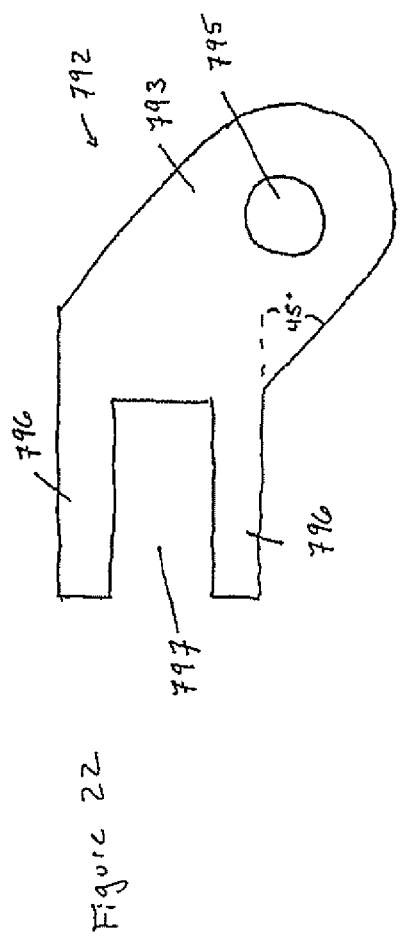

FIG. 20 depicts an exemplary rail mounting apparatus 980 comprising receiving assembly 904 in combination with an exemplary adaptor assembly 790, mounting assembly 300, and annular rail mount 100. Here, adaptor assembly 790 is substantially similar to adaptor assembly 700 as described above with reference to FIGS. 15 and 16. However, in lieu of swivel member 704, adaptor assembly comprises a swivel member 792. Referring to FIGS. 21 and 22, swivel member 792 comprises three fins 793 having a space 794 formed between each of three fins 793. Each of fins 793 comprises a hole 795 formed cross-wise therethrough. Swivel member 792 further comprises a pair of fins 796 which are separated from fins 793 at an approximately 45 degree angle. Pair of fins 796 has a space 797 which separates a fin of pair 796 from the other fin of pair 796. Further, each of fins from pair 796 has a hole 798 formed therethrough.

Referring to FIG. 20, fins 793 are attached to base 714 by aligning holes 713 of engaging members 712 with holes 795 of fins 793, and by inserting a fastening screw 799 therethrough. Pair of fins 796 are attached to tab 623 of interface mount 620 by aligning holes 798 of pair of fins 796 with hole 623 of tab 632 and by inserting a fastening screw 801 therethrough. Additionally, bottom side 626 of plate 620 fits within channel 324 of mounting assembly 300, while linear shaped rail 138 fits within channel 326 of mounting assembly 300.

Figure 23:
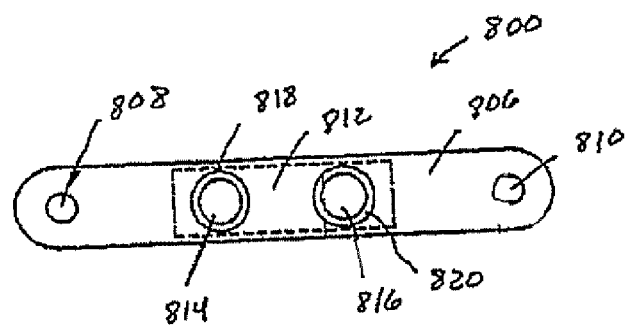
FIGS. 23 and 24 are schematics depicting another exemplary adaptor assembly.
Figure 24:
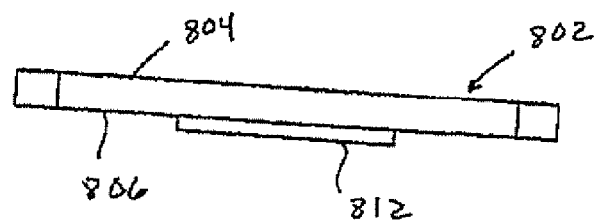

Another exemplary adaptor assembly is depicted in FIGS. 23 and 24. Here, an adaptor assembly 800 comprises a plate 802 having a top side 804 opposite to a bottom side 806. A hole 808 is formed through top side 804 and bottom side 808 while a hole 810 oppositely situated from hole 808 is formed through top side 804 and bottom side 808. Centrally disposed on bottom side 806 between hole 808 and hole 810, and extending from bottom side 806 is a mounting member 812, wherein mounting member 812 comprises holes 814 and 816 which are aligned with holes 818 and 820 formed through plate 802.

Figure 25:
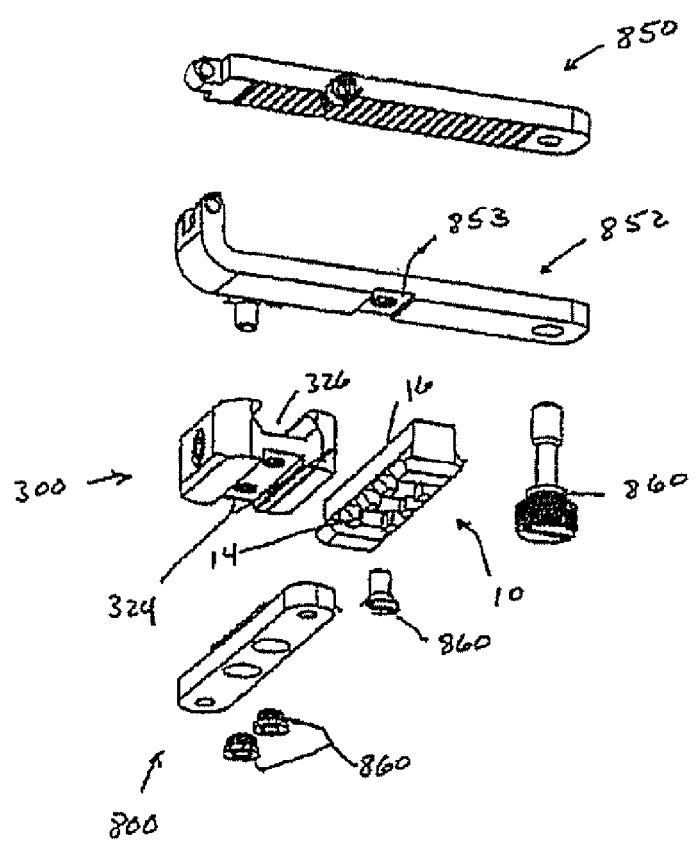
FIG. 25 is a schematic depicting an exemplary rail mounting apparatus comprising the adaptor assembly depicted in FIGS. 23 and 24, wherein the rail mounting apparatus may be attached to a bicycle's seat mount.

As shown in FIG. 25, adaptor assembly 800 is well suited for attachment of an accessory, such as, for example, a bicycle bag, to a bicycle seat mount 850. Bicycle seat mount 850 includes a seat mount 852 having a rail attachment site 853 formed therein, wherein site 853 is configured to engage with bottom side 16 of linear rail mount 10. Top side 14 of linear rail mount 10 is configured to engage with channel 326 of mounting assembly 300, while mounting member 812 of adaptor assembly 800 is engaged with channel 324 of mounting assembly 300. Fastening members 860 inserted through the various holes are used to secure bicycle seat mount 850 to linear rail mount 10, mounting assembly 300, and adaptor assembly 800.

Figure 26:
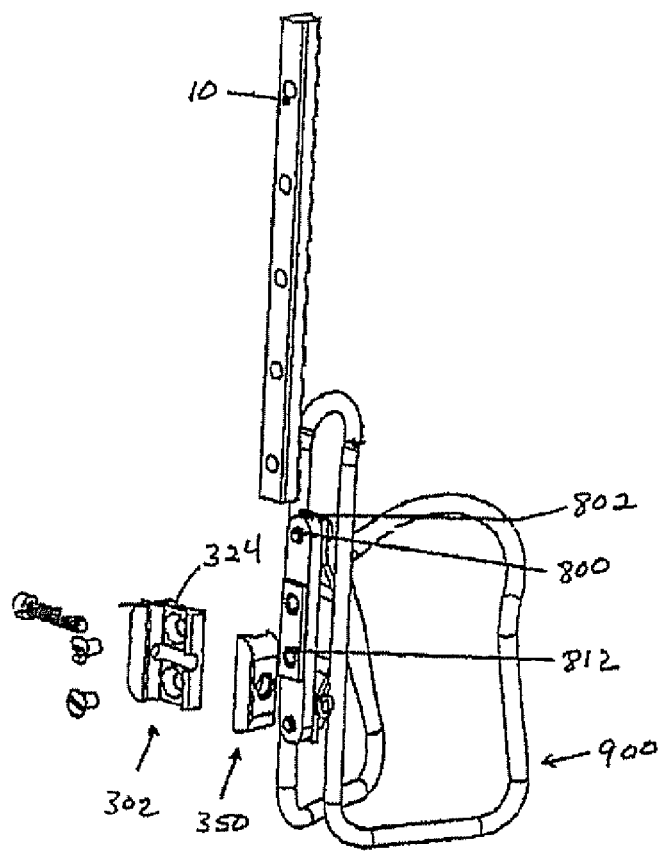
FIG. 26 is a schematic depicting an exemplary rail mounting apparatus comprising the adaptor assembly depicted in FIGS. 23 and 24 and the linear rail mount depicted in FIGS. 1-3, wherein the rail mounting apparatus may be attached to a bicycle's down tube mount.

FIG. 26 depicts another exemplary use of adaptor assembly 800 to secure a water bottle cage 900 to linear rail mount 10, wherein linear rail mount 10 may be attached to, e.g., a down tube of a bicycle. In this embodiment, water bottle cage 900 comprises a longitudinally extending first arm 902 which is substantially parallel to a longitudinally extending second arm 904, wherein arms 902 and 904 are connected to each other at an upper terminal end thereof by a bridge member 906. At an oppositely situated end of arms 902 and 904, arms 902 and 904 each turn substantially perpendicularly and extend outwardly therefrom to form a respective leg 908 and 910. Legs 908 and 910 each then turn and extend towards bridge member 906 to form respective arms 912 and 914, wherein an upper region of arm 912 is connected to an upper region of arm 914 by a connector 916. A chamber 918 is formed between arms 902, 904, bridge member 906, legs 908 and 910, arms 912 and 914, and connector 916, wherein chamber 918 may hold a water bottle.

Disposed between arms 902 and 904 and secured thereto is a plate 920. Plate 920 comprises a bottom side 922 which is directed away from chamber 918. A first terminal end 924 and an oppositely situated second terminal end 926 of plate 920 slope upwardly in a direction away from arms 902 and 904, and then turns vertically to form a respective plate 928 and 930, each of which is substantially parallel to awls 902 and 904. Each of plates 928 and 930 has a respective through hole 932 and 934 formed therethrough, wherein through holes 932 and 934 are directed towards chamber 918.

Top side 804 of plate 802 of adaptor assembly 800 is secured to plate 920 of water bottle cage 900 through the use of fasteners wherein a fastener is disposed through hole 932 and hole 808 and a fastener is disposed through hole 934 and hole 810, while mounting member 812 is engaged within channel 324 of mounting assembly 300 and top side 14 of linear rail mount 10 is engaged within channel 326 of mounting assembly 300.

Figure 31:
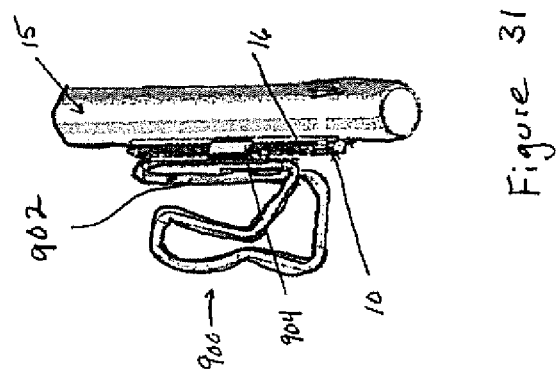
FIG. 31 is a schematic depicting an exemplary application of the rail mounting apparatus depicted in FIG. 26 to a bicycle frame.

An exemplary application of the rail mounting assembly depicted in FIG. 26 to a frame of a bicycle, wherein the frame may include, e.g., a top tube, a down tube, a seat tube, a seat post, and the like, is depicted in FIG. 31. Here, bottom side 16 of linear rail mount 10 is disposed on a frame 15 of a bicycle. Channel 326 of mounting assembly 300 receives bottom side 16 of body 12 of linear rail mount 10, while channel 324 of mounting assembly 300 receives arms 902 and 904 of water bottle cage 900.

Figure 27:
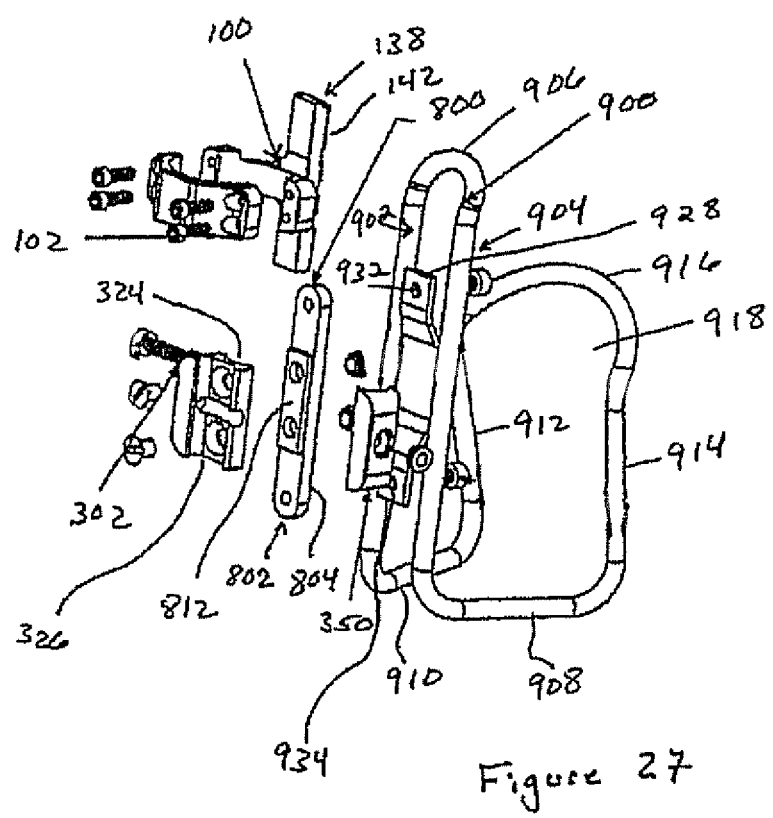
FIG. 27 is a schematic depicting an exemplary rail mounting apparatus comprising the adaptor assembly depicted in FIGS. 23 and 24 and the annular rail mount depicted in FIG. 4, wherein the rail mounting apparatus may be attached to a bicycle's seat post mount.
Figure 28:
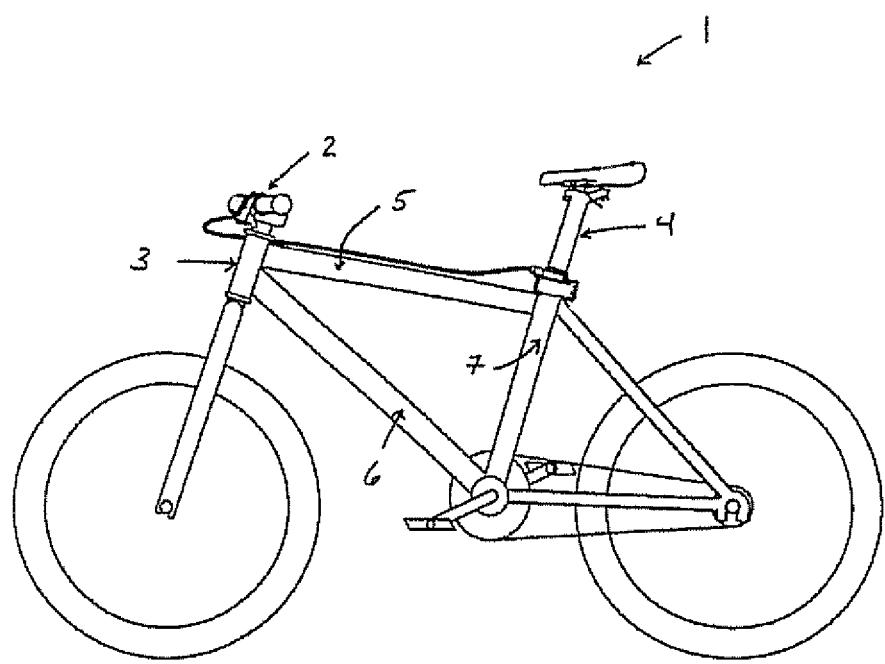
FIG. 28 is a schematic depicting an exemplary bicycle of the prior art.

FIG. 27 depicts another exemplary use of adaptor assembly 800 to secure water bottle cage 900 to annular rail mount 100, and further wherein annular rail mount 100 may be directly secured to, e.g., a down tube of a bicycle. In this embodiment, top side 804 of plate 802 of adaptor assembly 800 is secured to water bottle cage 900 in a manner substantially similar to that discussed with reference to FIG. 20, while mounting member 812 is engaged within channel 324 of mounting assembly 300 and top side 142 of linear shaped rail 138 is engaged within channel 326 of mounting assembly 300 such that bottom member 102 of annular rail mount 100 is directed away from cage 900.

An apparatus has been described using detailed descriptions of embodiments thereof that are provided by way of example and are not intended to limit the scope thereof. The described embodiments comprise different features, not all of which are required in all embodiments of the apparatus. Some embodiments of the apparatus utilize only some of the features or possible combinations of the features. Variations of embodiments of the apparatus that are described and embodiments of the apparatus comprising different combinations of features noted in the described embodiments will occur to persons of the art.

It will be appreciated by persons skilled in the art that the apparatus is not limited by what has been particularly shown and described herein above.

What is claimed is:

1. A rail mounting apparatus comprising:
   an adaptor assembly comprising:
      a swivel member comprising an accessory receiving member on a first end thereof and a mount receiving member on a second end thereof, wherein the first end is oppositely situated to the second end; and
      an interface mount comprising a plate having a top side opposite to a bottom side, and a tab disposed on the top side and extending therefrom;
   wherein the mount receiving member is engaged with the tab such that the interface mount is secured to the swivel member; and
   a mounting assembly comprising:
      a rail compatible mount comprising:
         a proximal side wall and a distal side wall each having: a top wall oppositely situated to a bottom wall, and a lateral wall which joins the top wall to the bottom wall; and
         a plate having a top side oppositely situated to a bottom side, wherein the plate is disposed between the proximal side wall and the distal side wall;
      a rail compatible clamp comprising:
         a main side wall having disposed on a top side thereof a top wall and having disposed on an oppositely situated bottom side thereof a bottom wall, and wherein the main side wall of the rail compatible clamp further has disposed on a lateral side thereof a first side wall, and has disposed on an oppositely situated lateral side thereof a second side wall;
   wherein the rail compatible mount and the rail compatible clamp are arranged such that:
      the top walls of the proximal and distal side walls, the top side of the plate, and the top wall of the rail compatible clamp form a first channel which receives the bottom side of the plate of the interface mount; and
      the bottom walls of the proximal and distal side walls, the bottom side of the plate, and the bottom wall of the rail compatible clamp form a second channel.

2. The rail mounting apparatus of claim 1, wherein the lateral walls of each of the proximal side wall and the distal side wall of the rail compatible mount comprise an opening formed therethrough, and wherein the main side wall of the rail compatible clamp comprises an opening formed therethrough, wherein the openings of the lateral walls of the proximal and distal side walls and of the main wall are aligned, and further wherein the rail mounting apparatus comprises a fastening member, wherein the fastening members is disposed through the openings of the lateral walls of the proximal and distal side walls and of the main wall to secure the rail compatible mount to the rail compatible clamp.

3. The rail mounting apparatus of claim 2, wherein the second channel of the mounting assembly comprises a dovetail configuration, and wherein the rail mounting apparatus further comprises:
   a linear rail mount having a longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
   a bicycle;
   wherein the bottom side of the longitudinally extending body of the linear rail mount is disposed on the bicycle.

4. The rail mounting apparatus of claim 2, further comprising an annular rail mount comprising:
   a longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
   an annular-shaped body having an opening formed therein, wherein the longitudinally extending body is in operable communication with the annular shaped body; and
   wherein the rail mounting apparatus further comprises:
      a bicycle, wherein a portion of the bicycle is disposed through the annular shaped body of the annular rail mount.

5. The rail mounting apparatus of claim 1, wherein the mount receiving member of the swivel member comprises a first fin and a second fin, wherein a space is created between the first and second fins, and further wherein the tab of the interface mount is received within the space.

6. The rail mounting apparatus of claim 5, wherein the tab comprises a hole formed therethrough, and wherein each of the first and second fins comprises a hole formed therethrough, wherein the holes of the tab and the first and second fins are aligned, and wherein the rail mounting apparatus further comprises a first fastening member which is inserted through the holes of the tab and the first and second fins to secure the interface mount to the swivel member.

7. The rail mounting apparatus of claim 6, further comprising:
   a longitudinally extending rod from which extends centrally therefrom a first fin and a second fin, wherein each of the first and second fins comprises a hole formed therethrough; and
   a second fastening member; and
   wherein the accessory receiving member comprises:
      a first fin, a second, fin, and a third fin, wherein all of the first, second, and third fins comprises a hole formed therethrough, wherein the holes of the first, second, and third fins are positioned transversely to the holes formed in the first and second fins of the mount receiving member; and a first space created between the first and second fins of the accessory receiving member, and a second space created between the second and third fins of the accessory receiving member; wherein the first fin which extends from the rod is received within the first space, and the second fin which extends from the rod is received within the second space such that the holes of the first and second fins which extend from the rod and the holes of the first, second, and third fins of the accessory receiving member are aligned, and wherein the second fastening member is disposed through the holes of the first, second, and third fins of the accessory receiving member and the holes of the first and second fins which extend from the longitudinally extending rod to thereby secure rod to the accessory receiving member.

8. The rail mounting apparatus of claim 6, further comprising an accessory, wherein the accessory is secured to the rod, and wherein the accessory is selected from the group consisting of a camera, a GPS device, a cell phone, and an I-pod.

9. A rail mounting apparatus comprising:
an adaptor assembly comprising:
an accessory mount comprising a base having a top side opposite to a bottom side; and
an interface mount comprising a plate having a top side opposite to a bottom side,
and a tab disposed on the top side and extending therefrom;
wherein the accessory mount is in operable communication with the interface mount; and
a mounting assembly comprising:
a rail compatible mount comprising:
a proximal side wall and a distal side wall each having a top wall oppositely situated to a bottom wall, and a lateral wall which joins the top wall to the bottom wall; and
a plate having a top side oppositely situated to a bottom side, wherein the plate is disposed between the proximal side wall and the distal side wall;
a rail compatible clamp comprising:
a main side wall having disposed on a top side thereof a top wall and having disposed on an oppositely situated bottom side thereof a bottom wall, and wherein the main side wall of the rail compatible clamp further has disposed on a lateral side thereof a first side wall, and has disposed on an oppositely situated lateral side thereof a second side wall;
wherein the rail compatible mount and the rail compatible clamp are arranged such that:
the top walls of the proximal and distal side walls, the top side of the plate, and the top wall of the rail compatible clamp form a first channel which receives the bottom side of the plate of the interface mount; and
the bottom walls of the proximal and distal side walls, the bottom side of the plate, and the bottom wall of the rail compatible clamp form a second channel.

10. The rail mounting assembly of claim 9, wherein the accessory mount further comprises a first fin and a second fin each of which extends from the bottom side of the base, wherein a space separates the first fin from the second fin, and wherein each of the first fin and the second fin comprises a hole formed therethrough, and wherein the tab of the interface mount comprises a hole formed therein, wherein the holes of the tab and of the first and second fins are aligned, and wherein the rail mounting assembly further comprises a first fastening member, wherein the first fastening member is disposed through the holes of the first and second fins and of the tab to secure the interface mount to the accessory mount.

11. The rail mounting apparatus of claim 10, further comprising a receiving assembly comprising:
a plate having a top face opposite to a bottom face, a first lateral side wall opposite to a second lateral side wall, and an upper side wall opposite to a lower side wall;
a plurality of brackets, wherein each bracket comprises a body having a front side opposite to a back side, and a flange which extends from the front side towards and beyond the back side, wherein at least one of the first lateral side wall, the second lateral side wall, and the lower side wall of the plate of the receiving assembly have at least one bracket from the plurality of brackets disposed thereon such that the flanges of the brackets are directed towards the top face of the plate.

12. The rail mounting assembly of claim 9, wherein the adaptor assembly further comprises a swivel member comprising an accessory receiving member on a first end thereof and a mount receiving member on a second end thereof, wherein the first end is oppositely situated to the second end, and wherein the tab of the interface mount is engaged with the mount receiving member.

13. The rail mounting assembly of claim 12, further comprising an accessory, wherein the accessory is disposed on the top side of the base of the accessory mount, and wherein the accessory is selected from the group consisting of a camera, a cell phone, a GPS device, and an I-pod.

14. The rail mounting assembly of claim 12, wherein the accessory receiving member is coplanar with the mount receiving member.

15. The rail mounting assembly of claim 12, wherein the accessory receiving member is angled relative to the mount receiving member.

16. The rail mounting assembly of claim 12, wherein the mount receiving member comprises a first fin and a second fin, wherein a space is created between the first and second fins, and further wherein the tab of the interface mount is received within the space.

17. The rail mounting assembly of claim 16, wherein the accessory mount further comprises a first fin and a second fin, each of which extends from the bottom side of the base, and wherein a space separates the first fin from the second fin, and wherein the accessory receiving member of the swivel member comprises a first fin, a second fin, and a third fin, wherein the second fin is disposed between the third fin, and wherein a space is formed between the first fin and the second fin and another space is formed between the second fin and the third fin, and further wherein the second fin of the accessory receiving member is disposed within the space between the first fin and the second fin of the accessory mount.

18. The rail mounting apparatus of claim 17, further comprising a receiving assembly comprising:
a plate having a top face opposite to a bottom face, a first lateral side wall opposite to a second lateral side wall, and an upper side wall opposite to a lower side wall;
a plurality of brackets, wherein each bracket comprises a body having a front side opposite to a back side, and a flange which extends from the front side towards and beyond the back side, wherein at least one of the first lateral side wall, the second lateral side wall, and the lower side wall of the plate of the receiving assembly have at least one bracket from the plurality of brackets disposed thereon such that the flanges of the brackets are directed towards the top face of the plate.

19. The rail mounting apparatus of claim 16, wherein the second channel of the mounting assembly comprises a dovetail configuration, and wherein the rail mounting apparatus further comprises:
- a linear rail mount having a longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
- a bicycle, wherein the bottom side of the longitudinally extending body of the linear rail mount is disposed on the bicycle.

20. The rail mounting apparatus of claim 16, wherein the second channel of the mounting assembly comprises a dovetail configuration, and wherein the rail mounting apparatus further comprises:
- an annular rail mount having:
  - a longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
  - an annular-shaped body having an opening formed therein, wherein the longitudinally extending body is in operable communication with the annular shaped body; and
- a bicycle, wherein a portion of the bicycle is disposed through the annular shaped body of the annular rail mount.

21. The rail mounting apparatus of claim 12, further comprising a receiving assembly comprising:
- a plate having a top face opposite to a bottom face, a first lateral side wall opposite to a second lateral side wall, and an upper side wall opposite to a lower side wall;
- a plurality of brackets, wherein each bracket comprises a body having a front side opposite to a back side, and a flange which extends from the front side towards and beyond the back side, wherein at least one of the first lateral side wall, the second lateral side wall, and the lower side wall of the plate of the receiving assembly have at least one bracket from the plurality of brackets disposed thereon such that the flanges of the brackets are directed towards the top face of the plate.

22. The rail mounting apparatus of claim 21, further comprising an accessory, wherein the accessory is selected from the group consisting of a cell phone, a GPS device, a camera, and an I-pod, and further wherein the accessory is held to the receiving assembly such that the accessory abuts the underside of the flange and the top face of the plate.

23. The rail mounting apparatus of claim 22, wherein the second channel of the mounting assembly comprises a dovetail configuration, and wherein the rail mounting apparatus further comprises:
- a linear rail mount having longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
- a bicycle, wherein the bottom side of the longitudinally extending body of the linear rail mount is disposed on the bicycle.

24. The rail mounting apparatus of claim 22, wherein the second channel of the mounting assembly comprises a dovetail configuration, and wherein the rail mounting apparatus further comprises:
- an annular rail mount having:
  - a longitudinally extending body having a top side oppositely situated to a bottom side and wherein the longitudinally extending body further comprises a dovetail configuration, wherein the longitudinally extending body is received within the second channel of the mounting assembly such that the top side is directed towards the plate of the interface mount of the adaptor assembly; and
  - an annular-shaped body having an opening formed therein, wherein the longitudinally extending body is in operable communication with the annular shaped body; and
- a bicycle, wherein a portion of the bicycle is disposed through the annular shaped body of the annular rail mount.

* * * * *